(12) United States Patent
Ealy et al.

(10) Patent No.: US 12,515,820 B2
(45) Date of Patent: Jan. 6, 2026

(54) SPACECRAFT COLLISION AVOIDANCE

(71) Applicant: THE BOEING COMPANY, Chicago, IL (US)

(72) Inventors: John Patrick Ealy, Long Beach, CA (US); Thomas Carl Koenitzer, Redondo Beach, CA (US)

(73) Assignee: THE BOEING COMPANY, Arlington, VA (US)

( * ) Notice: Subject to any disclaimer, the term of this patent is extended or adjusted under 35 U.S.C. 154(b) by 466 days.

(21) Appl. No.: 17/932,002

(22) Filed: Sep. 14, 2022

(65) Prior Publication Data

US 2024/0083598 A1    Mar. 14, 2024

(51) Int. Cl.
*B64G 1/24* (2006.01)
*B64G 1/52* (2006.01)

(52) U.S. Cl.
CPC ............. *B64G 1/242* (2013.01); *B64G 1/247* (2023.08); *B64G 1/52* (2013.01)

(58) Field of Classification Search
None
See application file for complete search history.

(56) References Cited

U.S. PATENT DOCUMENTS

| | | | | |
|---|---|---|---|---|
| 6,820,006 | B2 * | 11/2004 | Patera | G08G 5/80 701/301 |
| 7,437,246 | B2 * | 10/2008 | Kelly | G08G 3/02 701/301 |
| 11,807,404 | B2 * | 11/2023 | Weiss | B64G 1/2422 |
| 11,834,203 | B2 * | 12/2023 | Weiss | B64G 1/368 |
| 11,987,269 | B2 * | 5/2024 | Baker | B60W 60/0011 |
| 2022/0135076 | A1 * | 5/2022 | Baker | B60W 30/18154 701/26 |
| 2022/0227503 | A1 * | 7/2022 | Barnhart | G06N 3/126 |

* cited by examiner

*Primary Examiner* — Adam D Tissot
*Assistant Examiner* — Torrence S Marunda, II
(74) *Attorney, Agent, or Firm* — Moore IP Law

(57) ABSTRACT

Systems and methods include determining a collision probability between a first spacecraft and a second spacecraft; responsive to a determination that the collision probability exceeds a threshold, identifying a plane that is orthogonal to a relative velocity between the first spacecraft and the second spacecraft; determining a boundary on the plane that, when intersected by the first spacecraft, reduces the collision probability to a threshold level; selecting a first test point along the boundary and a second test point along the boundary; determining a first cost associated with maneuvering the first spacecraft towards the first test point and a second cost associated with maneuvering the first spacecraft towards the second test point, the first cost and the second cost based on one or more user-defined parameters; and maneuvering the first spacecraft toward a target point along the boundary that is determined based on the first cost and the second cost.

20 Claims, 6 Drawing Sheets

SPACECRAFT COLLISION AVOIDANCE

FIELD OF THE DISCLOSURE

The subject disclosure is generally related to spacecraft collision avoidance. In particular, the subject disclosure relates to systems and methods for efficiently selecting a spacecraft collision avoidance ("COLA") maneuver that minimally impacts mission objectives while achieving an acceptably low collision probability and performing that maneuver.

BACKGROUND

Spacecraft often face the issue of rapid, close-in collision avoidance, whether between a single active spacecraft and second, non-responsive spacecraft or between two active spacecraft. This is a problem of growing significance as low-earth orbits becomes more crowded. Integrated and/or coordinated collision avoidance ("COLA") efforts between space systems can be preferable, but as the number of spacecraft grows and more space systems proliferate non-maneuvering spacecraft, advance warning and coordination may not always be possible.

Generally, COLA maneuver planning can be coordinated and executed by space system operators and are thus typically executed well in advance of point of closest approach ("POCA"). As low-earth orbits grow more crowded, executing COLA maneuvers in advance of POCA may not always be possible. Additionally, early COLA maneuvers can become a more general orbit safety issue because such maneuvers themselves can also trigger a potential collision. With crowded low-earth orbits, general orbit safety issues become a complex coordination issue. Planning for a COLA maneuver early also leads to significant orbit-state uncertainty at POCA due to longer orbit propagation times and associated growth of satellite covariance volumes. This uncertainty further complicates the general orbit safety issues and can also result in unnecessary maneuvers. Many early-predict COLA situations will resolve naturally as prediction times and uncertainties shrink.

Further, early COLA maneuvers are typically orbit phase adjustments. This can create growing perturbations to orbit trajectories that often need to be resolved with subsequent maneuvers. This can be particularly true for formation flying satellite(s), satellite(s) in constellations, and/or human spaceflight with time critical and highly coordinated objectives (e.g., rendezvous with a space station and/or deorbit, landing, and/or recovery procedures).

Therefore, certain traditional satellite COLA methods can be expensive and lead to cross-system coordination problems. COLA maneuvers performed early can unnecessarily modify orbits, exacting a cost on vehicle life, or performance, due to uncertainties in predicted orbits of two satellites or vehicles.

SUMMARY

In a particular implementation, a device includes a memory and one or more processors coupled to the memory. The one or more processors are configured to determine a collision probability between a first spacecraft and a second spacecraft. The one or more processors are also configured to, in response to a determination that the collision probability exceeds a threshold, identify a two-dimensional plane that is orthogonal to a relative velocity between the first spacecraft and the second spacecraft. The one or more processors are also configured to determine a boundary on the two-dimensional plane that, when intersected by the first spacecraft, reduces the collision probability to a threshold level. The one or more processors are also configured to select at least a first test point along the boundary and a second test point along the boundary. The one or more processors are also configured to determine a first cost associated with maneuvering the first spacecraft towards the first test point and a second cost associated with maneuvering the first spacecraft towards the second test point, the first cost and the second cost based on one or more user-defined parameters. The one or more processors are also configured to maneuver the first spacecraft toward a target point along the boundary that is determined based on the first cost and the second cost.

In another particular implementation, a method includes determining a collision probability between a first spacecraft and a second spacecraft. The method also includes in response to a determination that the collision probability exceeds a threshold, identifying a two-dimensional plane that is orthogonal to a relative velocity between the first spacecraft and the second spacecraft. The method also includes determining a boundary on the two-dimensional plane that, when intersected by the first spacecraft, reduces the collision probability to a threshold level. The method also includes selecting at least a first test point along the boundary and a second test point along the boundary. The method also includes determining a first cost associated with maneuvering the first spacecraft towards the first test point and a second cost associated with maneuvering the first spacecraft towards the second test point, the first cost and the second cost based on one or more user-defined parameters. The method also includes maneuvering the first spacecraft toward a target point along the boundary that is determined based on the first cost and the second cost.

In another particular implementation, a non-transitory, computer-readable medium includes instructions that, when executed by one or more processors, cause the one or more processors to determine a collision probability between a first spacecraft and a second spacecraft. The instructions also cause the one or more processors to, in response to a determination that the collision probability exceeds a threshold, identify a two-dimensional plane that is orthogonal to a relative velocity between the first spacecraft and the second spacecraft. The instructions also cause the one or more processors to determine a boundary on the two-dimensional plane that, when intersected by the first spacecraft, reduces the collision probability to a threshold level. The instructions also cause the one or more processors to select at least a first test point along the boundary and a second test point along the boundary. The instructions also cause the one or more processors to determine a first cost associated with maneuvering the first spacecraft towards the first test point and a second cost associated with maneuvering the first spacecraft towards the second test point, the first cost and the second cost based on one or more user-defined parameters. The instructions also cause the one or more processors to maneuver the first spacecraft toward a target point along the boundary that is determined based on the first cost and the second cost.

The features, functions, and advantages described herein can be achieved independently in various implementations or can be combined in yet other implementations, further details of which can be found with reference to the following description and drawings.

DETAILED DESCRIPTION

Aspects disclosed herein present systems and methods for spacecraft collision avoidance. In particular, the systems and methods of the subject disclosure allow for efficiently selecting a spacecraft COLA maneuver with the goal of substantially optimizing impact on mission objectives while achieving an acceptably low collision probability performing that maneuver. A component of a space system (e.g., a spacecraft, spacecraft controller, etc.) with knowledge of a spacecraft's orbit state, as well as the state of intersecting orbiting objects can implement the systems and methods disclosed herein to aid a spacecraft in efficiently avoiding collision with other orbiting objects. For the purposes of the subject disclosure, a spacecraft's orbit state can be expressed using parameters indicating the spacecraft's position and velocity, time, and covariance (e.g., a matrix representation of uncertainty associated with the spacecraft's orbit state). Further, multiple space system components implementing the systems and methods disclosed herein can further increase the benefit(s) to individual space system components by mutually increasing individual points of closest approach ("POCAs"), as described in more detail below with reference to FIGS. 1-6.

The systems and methods disclosed herein can also allow a component of a space system to defer a spacecraft maneuver decision, reducing unnecessary maneuvers and mitigating impact of required maneuver(s). For example, a spacecraft departing a space station faces COLA risk after separation and planning of a deorbit maneuver sequence. An operator can defer a decision to abort deorbit and plan a velocity change maneuver until closer to the COLA POCA, when better information and/or less uncertainty is available. If a COLA velocity change maneuver is required, a minimally perturbing maneuver can be executed and the pre-planned deorbit sequence can continue.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents. Particular implementations are described herein with reference to the drawings. In the description, common features are designated by common reference numbers throughout the drawings.

Figure 1:
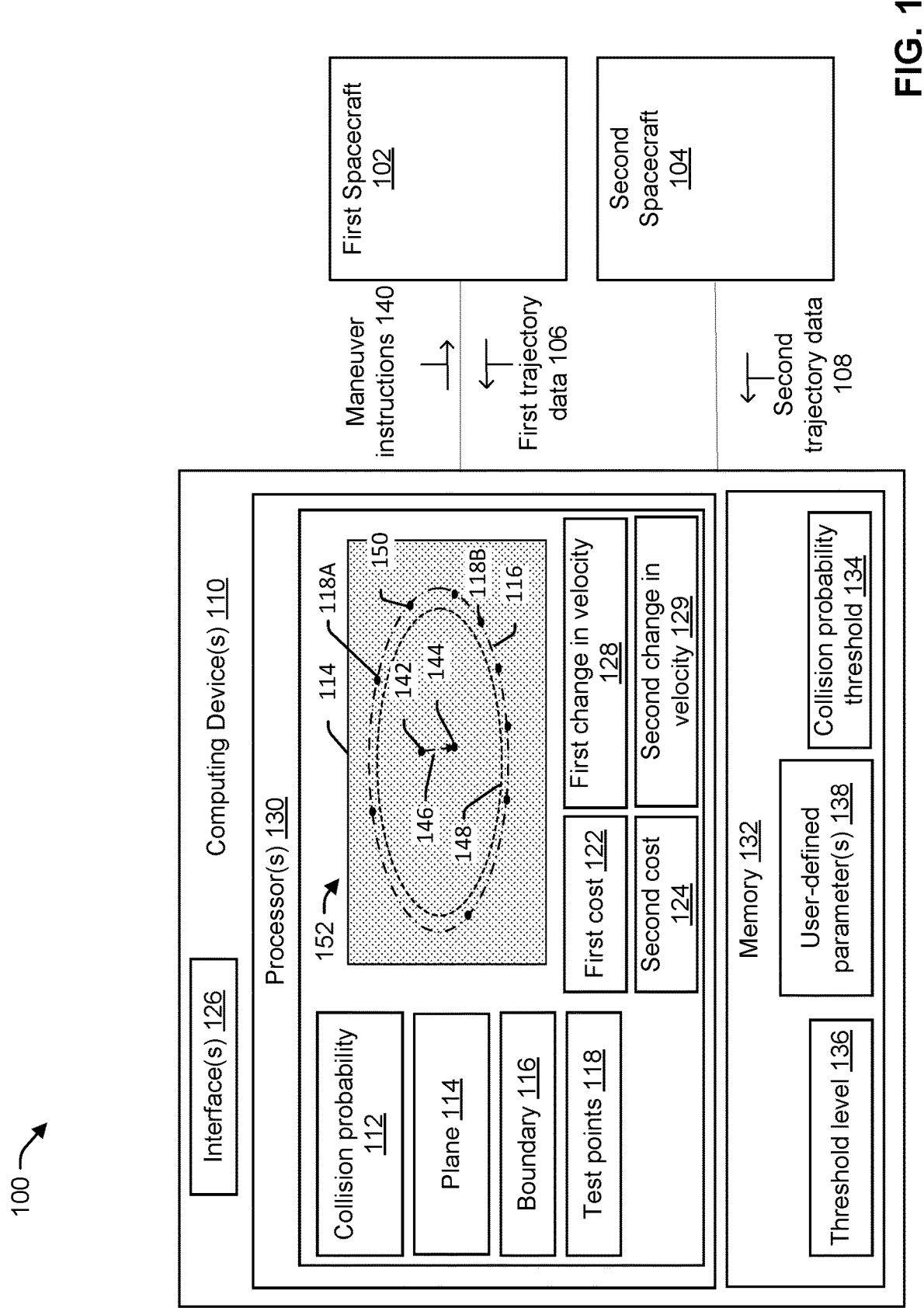
FIG. 1 depicts an example system for spacecraft collision avoidance, in accordance with at least one implementation of the subject disclosure.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a computing system 100 including one or more computing devices 110 ("computing device(s) 110" of FIG. 1), which indicates that in some implementations the system 100 includes a single computing device 110 and in other implementations the system 100 includes multiple computing devices 110. For ease of reference herein, such features are generally introduced as "one or more" features and are subsequently referred to in the singular unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple test points are illustrated and associated with reference numbers 118A and 118B. When referring to a particular one of these test points, such as the first test point 118A, the distinguishing letter "A" is used. However, when referring to any arbitrary one of these test points or to these test points as a group, the reference number 118 is used without a distinguishing letter.

The terms "comprise," "comprises," and "comprising" are used interchangeably with "include," "includes," or "including." Additionally, the term "wherein" is used interchangeably with the term "where." As used herein, "exemplary' indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for spacecraft collision avoidance, in accordance with at least one implementation of the subject disclosure. In some embodiments, system 100 includes one or more computing devices 110 configured to receive trajectory data corresponding to a first spacecraft 102 and a second spacecraft 104. In some embodiments, the spacecraft 102, 104 can be a spaceship, space station, satellite, one or more other spacecraft configured to adjust at least a portion of its orbital velocity via one or more maneuvers, or a combination thereof.

In some implementations, the first spacecraft 102 is configured to communicate first trajectory data 106 to the computing device(s) 110. As described in more detail below and with reference to FIGS. 2-5, the first trajectory data 106 can include data associated with the orbit state of the first spacecraft 102 as well as data associated with the covariance of the orbit state of the first spacecraft 102 (i.e., data associated with uncertainty of the first spacecraft 102's position, velocity, or some combination thereof). In a particular aspect, the first trajectory data 106 can include a location of the first spacecraft 102 at multiple points in time (e.g., as described in more detail below with reference to FIG. 2). Similarly, the second trajectory data 108 can include data associated with the orbit state of the second spacecraft 104 as well as data associated with the covariance of the second spacecraft 104 (i.e., data associated with uncertainty of the second spacecraft 104's position, velocity, or some combination thereof). In a particular implementation, the second spacecraft 104 is on a trajectory that could potentially intersect the trajectory of the first spacecraft 102. In a particular aspect, data associated with earth-based observations of the first spacecraft 102 can be included in the first trajectory data 106. In the same or alternative particular aspect, data associated with earth-based observations of the second spacecraft 104 can be included in the second trajectory data 108.

In some implementations, the first spacecraft 102 communicates the first trajectory data 106 to the computing device(s) 110 and the second spacecraft 104 communicates the second trajectory data 108 to the computing device(s) 110. As illustrated in the example system 100, the computing device(s) 110 are located remote from the first spacecraft 102 and the second spacecraft 104. In the same or alternative implementations, the computing device(s) 110 can be located within the first spacecraft 102, within the second spacecraft 104, within another spacecraft, within another component of a space system, within a component of a ground-based spacecraft control system, or at any other appropriate location. Further, in some configurations, one or more components of the computing device(s) 110 can be integral to one or more other processing systems associated with the first spacecraft 102, the second spacecraft 104, another spacecraft, another component of a space system, a component of a ground-based spacecraft control system, or any other appropriate computing environment.

In some implementations, the computing device(s) 110 receives the first trajectory data 106, the second trajectory data 108, or a combination thereof via one or more interfaces 126. In some configurations, the interface(s) 126 can include one or more input/output interface(s), as described in more detail below with reference to FIG. 6.

In some implementations, the computing device(s) 110 can store some or all of the first trajectory data 106, some or all of the second trajectory data 108, or some combination thereof (e.g., in a memory 132) for further processing. As described in more detail below with reference to FIGS. 2-5, the computing device(s) 110 can process and analyze the first trajectory data 106 and the second trajectory data 108 to efficiently select a spacecraft COLA maneuver that substantially optimizes impact on mission objectives while achieving an acceptably low collision probability. In some aspects, the computing device(s) 110 can also be configured to communicate maneuver instructions 140 to the first spacecraft 102, where the maneuver instructions 140 include data that instructs the first spacecraft 102 to perform a particular COLA maneuver, as described in more detail below.

In some implementations, the computing device(s) 110 can include one or more processors 130 coupled to the memory 132. The processor(s) 130 can be configured to perform various portions of the methods disclosed herein related to spacecraft collision avoidance. In some implementations, the processor(s) 130 can be configured to determine a collision probability 112 between the first spacecraft 102 and the second spacecraft 104. In some aspects, the collision probability 112 can be based on a first covariance associated with the first spacecraft 102 and a second covariance associated with the second spacecraft 104. In a particular aspect, determining the collision probability 112 can include the operations described in "Spacecraft Collision Probability for Long-Term Encounters," by Ken Chan, Proceedings of the 2021 AAS/AIAA Astrodynamics Specialist Conference, the contents of which are herein incorporated by reference.

In some implementations, the processor(s) 130 can also be configured to determine whether the collision probability 112 exceeds a collision probability threshold 134. For example, the processor(s) 130 can be configured to determine that the collision probability 112 exceeds a collision probability threshold of 2%, indicating that a collision is 2% likely to occur. In a particular aspect, the collision probability threshold 134 can be stored at the memory 132. In the same or alternative particular aspects, the collision probability threshold 134 can be dynamically determined, retrieved from another memory of the computing device(s) 110, communicated to the computing device(s) 110, etc.

In some implementations, the processor(s) 130 can also be configured to, in response to a determination that the collision probability 112 exceeds the collision probability threshold 134, identify a two-dimensional plane 114 that is orthogonal to a relative velocity between the first spacecraft 102 and the second spacecraft 104, as described in more detail below with reference to FIGS. 2-5. Although the plane 114 is graphically depicted in the accompanying figures for ease of explanation, it should be understood that the computing device(s) 110 may instead use a mathematical or other representation of the plane 114 instead of (or in addition to) a graphical representation. To illustrate, in some aspects, the plane 114 can be described by a plurality of data points stored at the memory 132.

In the same or alternative implementations, the processor(s) 130 can also be configured to determine a boundary 116 on the plane 114 that, when intersected by the first spacecraft 102, reduces the collision probability 112 to a threshold level 136, as described in more detail below with reference to FIGS. 2-5. For example, the processor(s) 130 can be configured to determine a boundary 116 on the plane 114 that, when intersected by the first spacecraft 102, reduces the collision probability 112 to a threshold level of 0.5%, indicating that a collision is 0.5% likely to occur. The threshold level 136 can be associated with a dynamic acceptable level of risk collision, a predetermined acceptable level of risk of collision, or some combination thereof. In a particular aspect, the threshold level 136 can be stored at the memory 132. In the same or alternative particular aspects, the threshold level 136 can be dynamically determined, retrieved from another memory of the computing device(s) 110, communicated to the computing device(s) 110, etc.

In the same or alternative implementations, the processor(s) 130 can also be configured to select at least a first test point and a second test point of the plurality of test points 118 along the boundary 116, as described in more detail below with reference to FIGS. 2-5. The processor(s) 130 can also be configured to determine a first cost 122 associated with maneuvering the first spacecraft 102 towards the first test point and a second cost 124 associated with maneuvering the first spacecraft 102 toward the second test point, the first cost 122 and the second cost 124 based on one or more user-defined parameters 138. In some aspects, the user-defined parameter(s) 138 can include a cost function associated with a first change in velocity 128 of the first spacecraft 102 and a second change in velocity 129 of the first spacecraft 102. For example, the cost function can include a calculation in the cost in resources (e.g., fuel, time, etc.) for the first spacecraft 102 to undergo the first change in velocity 128 versus undergoing the second change in velocity 129 that is different from the first change in velocity 128 (e.g., a correction to the velocity vector of the first spacecraft 102, as described in more detail below with reference to FIGS. 2-5).

As additional examples, the cost function can be associated with a burn direction for maneuvering the first spacecraft 102 to a particular test point of the plurality of test points 118, a change in orbit period associated with maneuvering the first spacecraft 102 to the particular test point, a change in velocity associated with maneuvering the first spacecraft to the particular test point (e.g., the first change in velocity 128), a point of closest approach with another object based on maneuvering the first spacecraft 102 to the particular test point, a comparison of a perigee associated with maneuvering the first spacecraft 102 to the particular test point to a perigee height lower threshold, an offset correction with respect to a position of the second spacecraft 104 associated with maneuvering the first spacecraft 102 to the particular test point, or any combination thereof.

Further, the cost function can be computed based on the one or more user-defined parameters 138, one or more of which can be scaled and/or resized via a user-defined gain, an exponent term, or some combination thereof. The user definition of the gain and/or exponent term(s) can be used to control a relative importance of each of the included user-defined parameters 138. A lowest-cost test point (e.g., one of the plurality of test points 118) can be used to determine an optimal offset from among a set of test points (e.g., as part of a COLA maneuver), as described in more detail below with reference to FIGS. 2-5.

The user-defined parameter(s) 138 can include, for example, a change in velocity to achieve a safe offset (including parameters defining a safe amount of offset). Lowering a change in velocity can, in some configurations, reduce impact on mission life of the first spacecraft 102, mitigate effects on a planned orbit trajectory for the first spacecraft 102, etc. The user-defined parameter(s) 138 can also include, for example; a change in a semi-major axis to achieve a safe offset (including parameters defining a safe amount of offset). Reducing a change in a semi-major axis can mitigate effects on a planned orbit period of the first spacecraft 102. Changes in orbit period integrate into an increased divergence from a planned orbit and an ability to track the first spacecraft 102 from the ground. The user-defined parameter(s) 138 can also include a cut back cost. A cut back cost can include one or more parameters defining a penalty for choosing an offset that cuts back towards and across the POCA, a reward for choosing an offset that moves further away from a preexisting POCA, or some combination thereof. A cut back cost can reduce a risk of choosing a maneuver that swings a primary orbit of the first spacecraft 102 across that of a secondary orbit of the second spacecraft 104. Anomalies in mid-COLA velocity changes can result in worse POCA ranges and can increase risk of collision. Further, multiple space systems applying the cut back cost with respect to one another can result in the associated spacecraft being maneuvered away from one another.

Although certain parameters have been described above as part of various cost functions, the user-defined parameter(s) 138 of the system 100 can include more, fewer, and/or different parameters without departing from the scope of the subject disclosure. Further, although the computing device(s) 110 are described as determining the maneuver instructions 140 to reduce risk of collision with a second spacecraft 104, in other implementations the disclosed techniques can be used to maneuver the first spacecraft 102 to reduce risk of collision with a non-spacecraft object (e.g., a natural object, man-made debris, etc.).

FIG. 1 depicts a non-limiting graphical example 152 of portions of the system 100 in operation. The example 152 illustrates a selected set of test points 118 (including a first test point 118A and a second test point 118B) along a boundary 116 on a plane 114 that is orthogonal to a relative velocity between the first spacecraft 102 and the second spacecraft 104, as described previously and below with reference to FIGS. 2-5. In the example 152, the first spacecraft 102 can be at a position 144 associated with a predicted position of the first spacecraft 102 at POCA. Similarly, the position 142 can be associated with a predicted position of the second spacecraft 104 at POCA. The vector 146 between the position 142 and the position 144 can be associated with a "miss vector," as described in more detail below with reference to FIGS. 2-5. In a particular aspect, the miss vector 146 can be an estimated POCA miss vector between the first spacecraft 102 and the second spacecraft 104, without a COLA maneuver, in an inertial frame.

Further in the example 152, the ellipsis 148 can be associated with a collision probability threshold (e.g., the collision probability threshold 134). For example, the area in the plane 114 within the ellipsis 148 can be associated with unacceptable collision probabilities, while the area in the plane 114 outside the ellipsis 148 can be associated with acceptable collision probabilities. In the example illustrated in FIG. 1, the position 144 of the first spacecraft 102 within the ellipsis 148 would be associated with an unacceptable probability of collision with the second spacecraft 104 at the position 142.

In the example illustrated in FIG. 1, a boundary (e.g., the boundary 116) can be determined (e.g., by the processor(s) 130) on the plane 114 that, when intersected by the first spacecraft 102, reduces the collision probability 112 to a threshold level (e.g., the threshold level 136). In the example illustrated in FIG. 1, the boundary 116 is outside of the ellipsis 148—i.e., the boundary that, when intersected by the first spacecraft 102 reduces the collision probability 112 to a level below (e.g., outside of) the threshold level 136.

In the example illustrated in FIG. 1, a first cost (e.g., the first cost 122) associated with causing a first change in velocity (e.g., the first change in velocity 128) of the first spacecraft 102 that would enable the first spacecraft 102 to alter its trajectory such that the first spacecraft 102 would be at the position 118A at POCA rather than at the position 144 can be analyzed with respect to a second cost (e.g., the second cost 124) associated with causing a second change in velocity (e.g., the second change in velocity 129) of the first spacecraft 102 that would enable the first spacecraft 102 to alter its trajectory such that the first spacecraft 102 would be at the position 118B at POCA rather than at the position 144. For example, the respective cost functions—as described in more detail below with reference to FIGS. 2-5—can be analyzed (e.g., by the processor(s) 130) to determine a position 150 associated with an optimization of a cost function for an appropriate COLA maneuver. In some examples, a linear interpolation of (or other approximation technique based on) the cost functions associated with the test points 118A and 118B can be used to select the position 150 as having a lowest approximated cost function. Data associated with the maneuver to move the first spacecraft 102 to the position 150 can then be communicated (e.g., as the maneuver instructions 140) to the first spacecraft 102.

Figure 2:
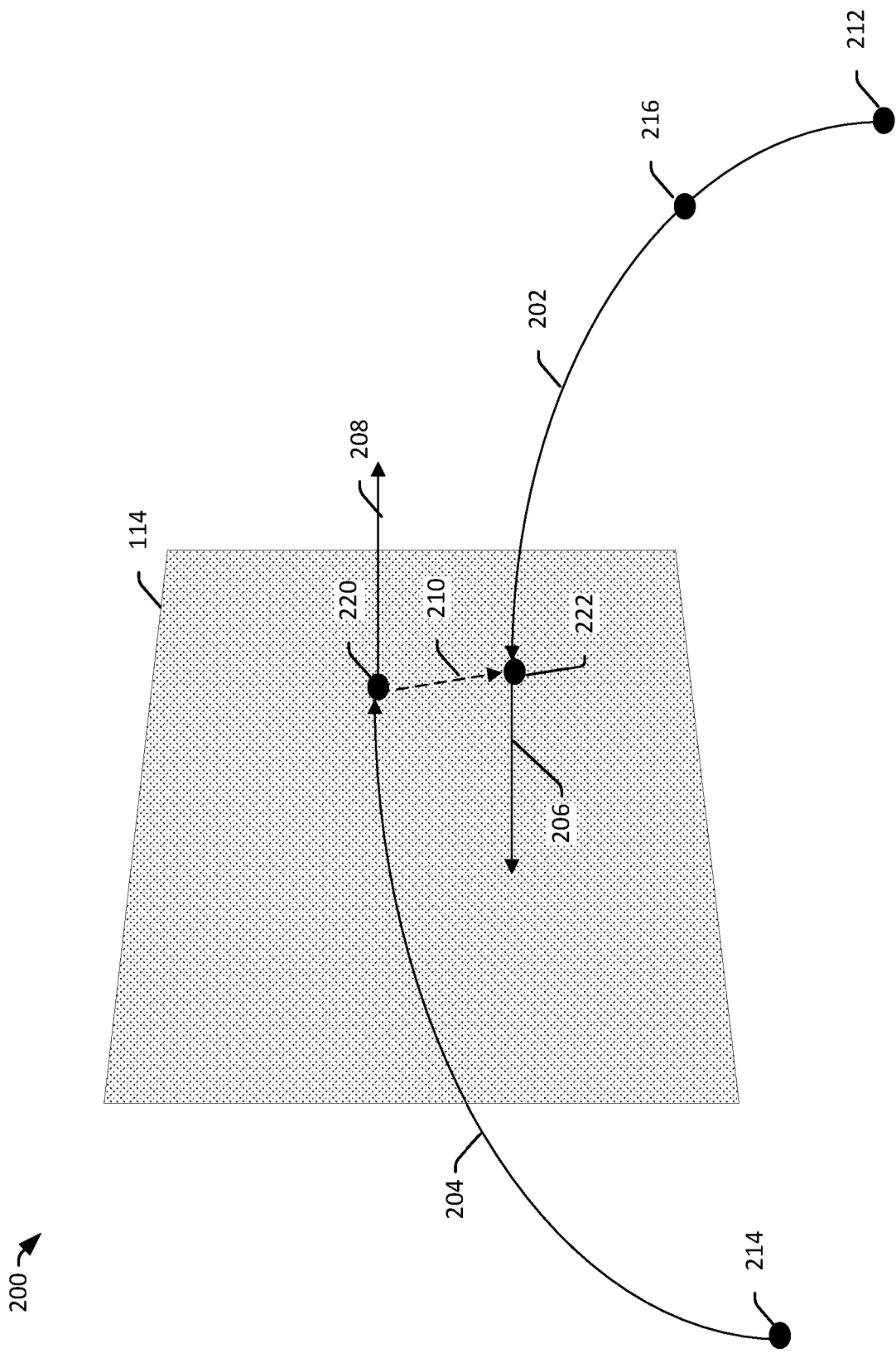
FIG. 2 is an example illustration of a plane orthogonal to a relative velocity between the first spacecraft and the second spacecraft, in accordance with at least one implementation of the subject disclosure.

The plane 114 described previously and illustrated in the example 152 can also be referred to as a "beta-plane" or "β-plane." Another view of the plane 114 is illustrated below with reference to FIG. 2. FIG. 2 is an example illustration 200 of the plane 114 orthogonal to a relative velocity between the first spacecraft 102 and the second spacecraft 104, in accordance with at least one implementation of the subject disclosure. In the example illustration 200, the first spacecraft 102 is at a first position 212 at a first time (e.g., at the moment the collision probability 112 is determined), while the second spacecraft 104 is at a second position 214 at the same time. A first trajectory 202 of the first spacecraft 102 from the first position 212 can take the first spacecraft 102 to a third position 222. Similarly, a second trajectory 204 of the second spacecraft 104 from the second position 214 can take the second spacecraft 104 to a fourth position 220. In a particular aspect, the third position 222 and the fourth position 220 occur at a point in time where the first spacecraft 102 is at the point of closest approach ("POCA") to the second spacecraft 104. In a particular aspect, the POCA corresponds to a projected intersection point (e.g., the third position 222) on the plane 114 for the first spacecraft 102.

The first spacecraft 102 can have a first velocity 206 at the third position 222 (e.g., the position of the first spacecraft 102 when the first spacecraft 102 is at POCA relative to the second spacecraft 104). Similarly, the second spacecraft 104 can have a second velocity 208 at the fourth position 220 (e.g., the position of the second spacecraft 104 when the second spacecraft 104 is at POCA relative to the first spacecraft 102). The first velocity 206 is graphically represented as an arrow having a length corresponding to an estimated speed, and having a direction corresponding to an estimated direction of travel, of the first spacecraft 102 at the third position 222. The velocity 208 is graphically represented as an arrow having a length corresponding to an estimated speed, and having a direction corresponding to an estimated direction of travel, of the second spacecraft 104 at the fourth position 220.

In some implementations, the system 100 of FIG. 1 can be configured to determine a relative velocity between the first spacecraft 102 and the second spacecraft 104 at the POCA. For example, the processor(s) 130 of FIG. 1 can be configured to determine a relative velocity vector by determining a difference between the velocity of the first spacecraft 102 and the velocity of the second spacecraft 104. As detailed above, the system 100 can be configured to identify a plane (e.g., the plane 114) that is orthogonal to the relative velocity between the first spacecraft 102 and the second spacecraft 104. In the example illustration of FIG. 2, the plane 114 is one such exemplary orthogonal plane. In some aspects, the system 100 of FIG. 1 can also be configured to determine a miss vector 210 between the third position 222 and the fourth position 220.

Returning to FIG. 1, in some implementations, the system 100 can be configured to determine maneuver instructions (e.g., the maneuver instructions 140) for the first spacecraft 102 to avoid a collision with the second spacecraft 104. Any COLA maneuver takes a finite amount of time to occur. Thus, in order to successfully perform a COLA maneuver prior to the POCA, the system 100 of FIG. 1 can be configured to determine a time of ignition for the COLA maneuver ("$TIG_{COLA}$"). The time of ignition can be associated with an amount of time required for a particular COLA maneuver to both occur at the first spacecraft 102 and for the desired effects of the COLA maneuver to take place. In the example illustration of FIG. 2, the fifth position 216 of the first spacecraft 102 along the first velocity 206 is associated with the $TIG_{COLA}$. The fifth position 216 can be the point at which a COLA maneuver should begin in order to avoid collision between the first spacecraft 102 and the second spacecraft 104.

In some aspects, the processor(s) 130 of FIG. 1 can be further configured to estimate a change in velocity for the first spacecraft 102 at the POCA (e.g., the position 222) required at the time of ignition (e.g., at the time the first spacecraft 102 is at the position 216) as a function of a positional adjustment for the first spacecraft 102 in the plane 114. For example, the processor(s) 130 of FIG. 1 can apply a state perturbation method to compute a state transition matrix from $TIG_{COLA}$ to POCA ("$\Phi_{COLA \to POCA}$"):

$$\Phi_{COLA \to POCA} = \begin{bmatrix} [\Phi_{\delta r_{poca}}/\delta r_{cola}] & [\Phi_{\delta r_{poca}}/\delta v_{cola}] \\ [\Phi_{\delta v_{poca}}/\delta r_{cola}] & [\Phi_{\delta v_{poca}}/\delta v_{cola}] \end{bmatrix}.$$

The computation of the state transition matrix above considers a state transition of the first spacecraft 102 resulting from the change in position to POCA ("$\Phi_{\delta r_{poca}}$"), a state transition of the first spacecraft 102 resulting from the change in velocity at POCA ("$\Phi_{\delta v_{poca}}$"), the change in position associated with the COLA maneuver ("$\delta r_{cola}$"), and the change in velocity associated with the COLA maneuver ("$\delta v_{cola}$"). The processor(s) 130 of FIG. 1 can, in some aspects, be configured to estimate a change in velocity for the COLA maneuver ("$\Delta V_{COLA}$"), also taking into account the adjustment of the POCA offset vector in the plane 114 ("$\delta r_{\beta\text{-}plane}$"):

$$\sim \Delta V_{COLA} = \left[\Phi_{\delta r_{poca}}/\delta v_{cola}\right]^{-1} \delta r_{\beta\text{-}plane}.$$

Figure 3:
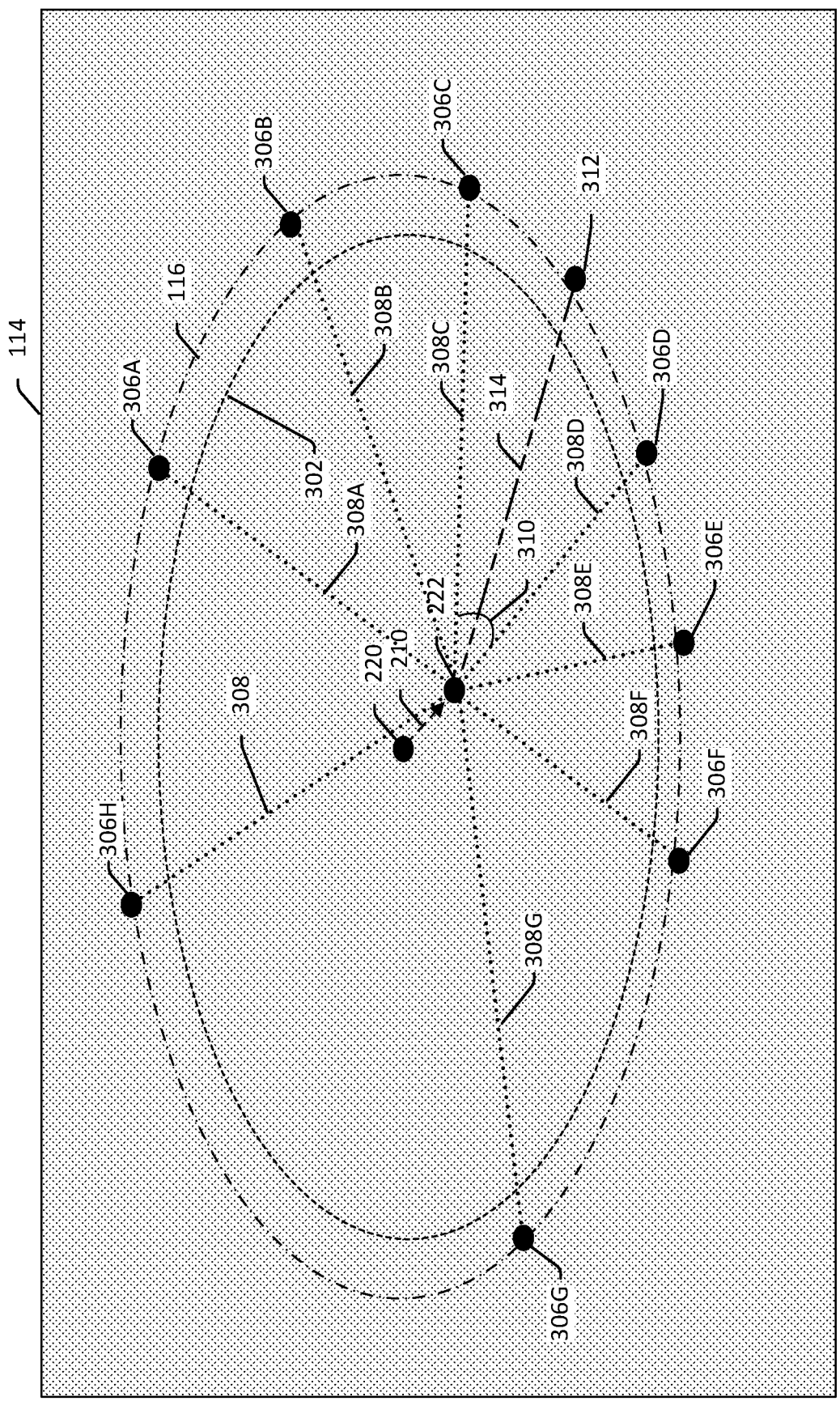
FIG. 3 provides an example illustration of a direct view of the plane orthogonal to a relative velocity of the first spacecraft and the second spacecraft, in accordance with at least one implementation of the subject disclosure.

In order to determine an appropriate COLA maneuver, the system 100 of FIG. 1 can, as described in more detail above, determine a boundary 116 on the plane 114 that, when intersected by the first spacecraft (e.g., at the third position 222), reduces the collision probability 112 to a threshold level 136. FIG. 3 provides an example illustration 300 of a direct view of the plane 114 orthogonal to a relative velocity of the first spacecraft 102 at the third position 222 and the second spacecraft 104 at the fourth position 220, in accordance with at least one implementation of the subject disclosure. The example illustration 300 also illustrates the miss vector 210 between the third position 222 and the fourth position 220.

The example illustration 300 also illustrates a collision probability limit 302. The collision probability limit 302 is illustrated as a substantially elliptical boundary inside of which a collision probability between the first spacecraft 102 and the second spacecraft 104 is greater than or equal to a collision probability threshold (e.g., the collision probability threshold 134 of FIG. 1). For example, if the fourth position 220 is at the center of the collision probability limit 302, and the third position 222 is inside of the collision probability limit 302, then the probability of collision between the first spacecraft 102 and the second spacecraft 104 is unacceptably high. If the third position 222 is outside of the collision probability limit 302, then the probability of collision between the first spacecraft 102 and the second spacecraft 104 is at an acceptable level. In some aspects, the collision probability limit 302 can be based on a combined covariance of the first spacecraft 102 and of the second spacecraft 104. Although the example illustration 300 depicts the collision probability limit 302 as elliptical, in other examples the collision probability limit 302 could represent boundaries of one or more non-elliptical areas associated with unacceptable collision probabilities around the position of the second spacecraft 104 and/or the first spacecraft 102 without departing from the scope of the subject disclosure.

As described previously with reference to FIGS. 1-2, the system 100 of FIG. 1 can be configured to determine a boundary 116 on the plane 114 that, when intersected by the first spacecraft, reduces the collision probability 112 to a threshold level 136. By determining the boundary 116, the system 100 can identify an acceptable point beyond the collision probability limit 302 to which the first spacecraft 102 can be moved such that the probability of collision is reduced while considering other mission parameters and reducing operational costs (e.g., time, fuel, etc.). In some implementations, the processor(s) 130 of FIG. 1 can be configured to select a plurality of test points 306 along the boundary 116. In the example illustration 300, eight test points 306 (e.g., test points 306A, 306B, 306C, 306D, 306E, 306F, 306G, 306H) are illustrated, although more, fewer, and/or different test points can be selected along a boundary without departing from the scope of the subject disclosure. Further, in some aspects, the test points 306 can be distributed substantially uniformly along the boundary 116. In alternative aspects, the test points 306 can be distributed in a non-uniform manner (e.g., more densely located in a direction away from the miss vector 210, more sparsely located in the same direction as the miss vector 210, randomly or pseudo-randomly selected, etc.).

In some implementations, each of the plurality of test points 306 along the boundary 116 can have an associated position change 308. The position change 308 can be associated with a change in the position of the first spacecraft 102 from the third position 222 to the position of the particular test point 306 associated with the particular position change 308. For example, the position change 308A can be the change in the position of the first spacecraft 102 at POCA, from the third position 222 to the position of the test point 306A, while the position change 308G can be the change in the position of the first spacecraft 102 at POCA from the third position 222 to the test point 306G.

In some implementations, the processor(s) 130 of FIG. 1 can be configured to determine a change in velocity required at $TIG_{COLA}$ to achieve each of the position changes 308 (e.g., to redirect the first spacecraft 102 from moving from the position 222 to instead move to the position of each of the test points 306 on the boundary 116). In a particular aspect, the processor(s) 130 of FIG. 1 can use $\Phi_{COLA \to POCA}$ to determine the change in velocity required at $TIG_{COLA}$. For example, if $R_{test\_G}$ is a vector associated with the position change 308G associated with the test point 306G, then the change in velocity required at $TIG_{COLA}$ to move the primary spacecraft 102 to the test point 306G ("$\Delta V_{Test\_G}$") can be estimated by:

$$\sim \Delta V_{Test\_G} = \left[\Phi_{\delta r_{poca}}/\delta v_{cola}\right]^{-1} R_{test\_G}$$

In some implementations, the processor(s) 130 of FIG. 1 can be further configured to determine a first cost associated with maneuvering the first spacecraft towards the first test point and a second cost associated with maneuvering the first spacecraft towards the second test point, where the first cost and the second cost are based on one or more user-defined parameters. For example, a total cost associated with a particular test point 306 can be generated as a weighted total of various cost factors. Exemplary cost factors include a change in velocity, a change in orbit period, a burn direction associated with the particular maneuver (e.g., an in-track burn direction is generally lower cost), a level of perigee violation, an offset correction crossing an orbit of the second spacecraft 104 at the POCA, future POCAs with other objects, etc. The one or more user-defined parameters (e.g., the user-defined parameters 138 of FIG. 1) can, in a particular aspect, be associated with one or more of the cost factors, one or more weights assigned to one or more of the cost factors, one or more weighted cost factors, etc. For example, a user-defined parameter can include a user selected gain applied to a predicted change in an orbit period or a minimum safe height of perigee. As a particular example, the total cost associated with a particular test point 306 ("$\Delta Cost$") can be calculated as:

$$\Delta Cost = k_1 {*} C_1 + k_2 {*} C_2 + \ldots + k_n {*} C_n$$

In the above particular example, $k_n$ is a particular user-defined parameter, $C_n$ is a change to a cost function relative to the predicted POCA (e.g., a change in orbit period), an absolute limit (e.g., a safe height of perigee), or some combination thereof.

In some aspects, the processor(s) 130 of FIG. 1 can apply the change in velocity at $TIG_{COLA}$ to move the first spacecraft 102 to a given test point 306 to determine effects of a maneuver on an orbit of the first spacecraft 102 with respect to a cost incurred if the change in velocity is undertaken. In a particular aspect, the processor(s) 130 can determine a cost associated with each of the test points 308 on the boundary 116. The processor(s) 130 can also be configured to select a subset of the test points 308 based at least on the costs associated with each of the test points 308.

For example, the processor(s) 130 can determine a probability-cost factor associated with each of the test points 308 (e.g., by determining a ratio of the change in collision probability associated with maneuvering the first spacecraft 102 to a particular test point 306 to the cost associated with maneuvering the first spacecraft 102 to the particular test point 306). The processor(s) 130 can be configured to rank the test points 308 based on the corresponding associated costs, the corresponding probability-cost factor(s), etc. The processor(s) 130 can also be configured to identify one or more of the highest-ranked test point(s) 306, as well as select one or more neighboring test points of the highest-ranked test point. In the particular illustrated example of FIG. 3, the test points 306D can be identified as the highest-ranked test point of the test points 306 due to it having the best (e.g., the largest determined) probability-cost factor. The test point 306C can also be selected as a neighbor to the highest-ranked test point 306D.

In some aspects, an angle 310 exists between the position change 308C and the position change 308D associated with the test points 306C and 306D, respectively. By curve fitting relative to the angle 310, the processor(s) 130 of FIG. 1 can be configured to determine a target point 312 on the boundary 116 to which to maneuver the primary spacecraft 102. In the same or alternative aspects, the processor(s) 130 of FIG. 1 can be configured to determine the target point 312 by, for example, selecting the highest-ranked test point of the test points 306 without performing the curve fitting. As an additional example, the processor(s) 130 can be configured to determine the target point 312 by generating a second set of test points between two relatively high-ranked test points of the first set of test points (e.g., the test points 306C and 306D of FIG. 3), and selecting the highest-ranked of the second set of test points as the target point 312. In a particular aspect, the processor(s) 130 can be configured to iterate this process a predetermined number of times to identify the target point 312.

The processor(s) 130 can also be configured to determine a vector 314 from the position 222 to the optimal point 312, as well as an offset vector from the position 220 of the second spacecraft 104 to the target point 312, as illustrated below in FIG. 4. The offset vector illustrates a larger POCA for the first spacecraft 102 relative to the second spacecraft 104. The offset vector can be used (e.g., by the processor(s) 130) by a dynamic, offset-vector based, maneuver planning function that computes $\Delta V_{COLA}$ based on the offset vector.

Figure 4:
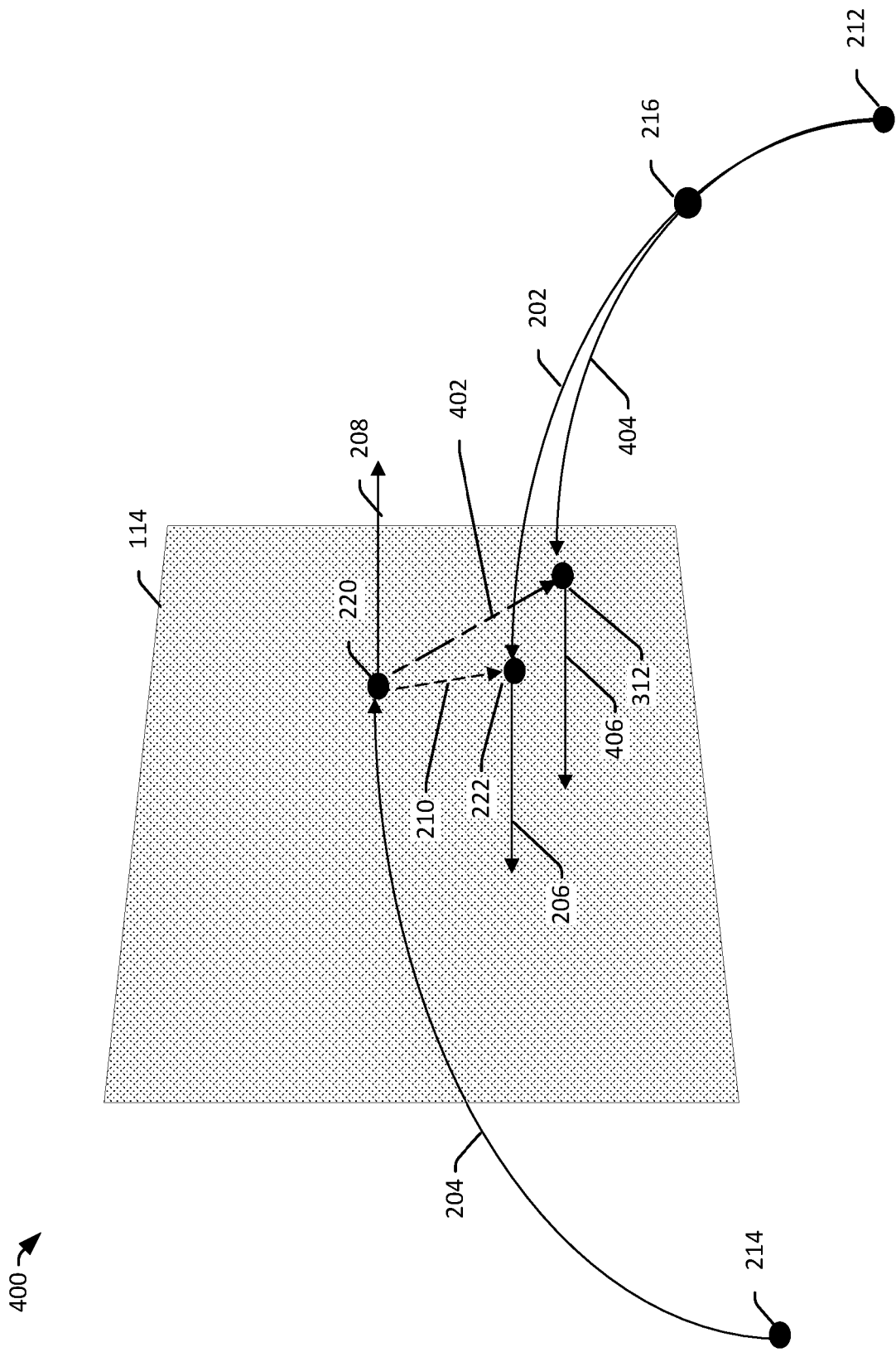
FIG. 4 is another example illustration of a plane orthogonal to a relative velocity between the first spacecraft and the second spacecraft, in accordance with at least one implementation of the subject disclosure.

FIG. 4 is another example illustration 400 of the plane 114 orthogonal to a relative velocity between the first spacecraft 102 and the second spacecraft 104, in accordance with at least one implementation of the subject disclosure. The example illustration 400 illustrates the first spacecraft 102 at positions 212, 216, 222 according to the second trajectory 204, and the second spacecraft 104 at positions 214, 220 according to the first trajectory 202, as described previously with reference to FIG. 2. The example illustration 400 also illustrates the first velocity 206 and the second velocity 208, as described previously with reference to FIG. 2.

The example illustration 400 also illustrates relative positions of the first spacecraft 102 and the second spacecraft 104 of FIG. 1 after determining the target point 312, as described previously with reference to FIG. 3. As described above with reference to FIG. 3, the example illustration 400 illustrates an offset vector 402 from the fourth position 220 of the second spacecraft 104 to the target point 312. In order to arrive at the position of the target point 312, the trajectory of the first spacecraft 102 changes from the trajectory 202 to the trajectory 404 by executing a COLA maneuver at the position 216, as described previously with reference to FIGS. 1-3. At the position of the target point 312, the first spacecraft 102 can have a third velocity 406. In some aspects, the third velocity 406 can be only marginally different than the first velocity 206. To illustrate, in some examples, the vast majority of orbit velocity (e.g., at least three orders of magnitude) of the first spacecraft 102 is due to orbital dynamics (e.g., gravity) that is not applied to the change in velocity of the COLA maneuver.

Figure 5:
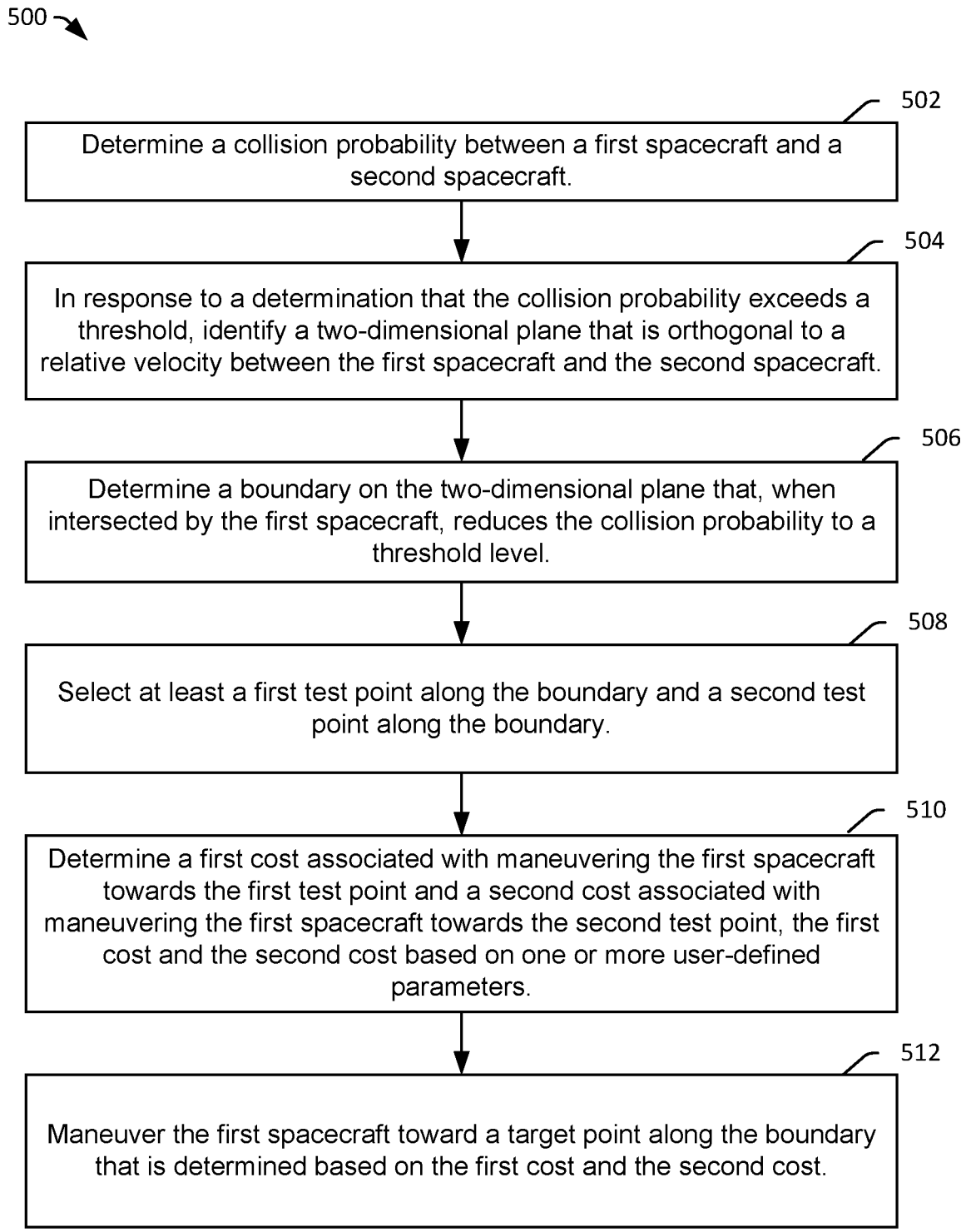
FIG. 5 is a flow chart of an example of a method for spacecraft collision avoidance, in accordance with at least one implementation of the subject disclosure.

FIG. 5 is a flow chart of an example of a method 500 for spacecraft collision avoidance, in accordance with at least one implementation of the subject disclosure. The method 500 may be initiated, performed, or controlled by one or more processors executing instructions, such as by the processor(s) 130 of FIG. 1 executing instructions from the memory 132.

In some embodiments, the method 500 includes, at block 502, determining a collision probability between a first spacecraft and a second spacecraft. For example, the processor(s) 130 of FIG. 1 may determine the collision probability 112 between the first spacecraft 102 and the second spacecraft 104, as described previously with reference to FIG. 1.

In the example of FIG. 5, the method 500 also includes, at block 504, in response to a determination that the collision probability exceeds a threshold, identifying a two-dimensional plane that is orthogonal to a relative velocity between the first spacecraft and the second spacecraft. For example, the processor(s) 130 of FIG. 1 can, in response to a determination that the collision probability 112 exceeds the collision probability threshold 134, identify the plane 114 orthogonal to the direction of the relative velocity between the first spacecraft 102 and the second spacecraft 104, as described previously with reference to FIGS. 1-4.

In the example of FIG. 5, the method 500 also includes, at block 506, determining a boundary on the two-dimensional plane that, when intersected by the first spacecraft, reduces the collision probability to a threshold level. For example, the processor(s) 130 of FIG. 1 can determine the boundary 116 on the plane 114 that, when intersected by the first spacecraft 102, reduces the collision probability 112 to (or below) the threshold level 136, as described previously with reference to FIGS. 1-4.

In the example of FIG. 5, the method 500 also includes, at block 508, selecting at least a first test point along the boundary and a second test point along the boundary. For example, the processor(s) 130 of FIG. 1 can select the test points 306A-306H along the boundary 116, as described previously with reference to FIGS. 1-4. The method 500 also includes, at block 510, determining a first cost associated with maneuvering the first spacecraft towards the first test point and a second cost associated with maneuvering the first spacecraft towards the second test point, the first cost and the second cost based on one or more user-defined parameters. For example, the processor(s) 130 of FIG. 1 can determine the first cost 122 associated with maneuvering the first spacecraft 102 towards the test point 306C and the second cost 124 associated with maneuvering the first spacecraft 102 towards the test point 306D, where the first cost 122 and the second cost 124 are based on one or more of the user-defined parameters 138, as described previously with reference to FIGS. 1-4.

In the example of FIG. 5, the method 500 also includes, at block 512, maneuvering the first spacecraft toward a target point along the boundary that is determined based on the first cost and the second cost. For example, the processor(s) 130 of FIG. 1 can generate one or more maneuver instructions 140 for communication to the first spacecraft 102, where the maneuver instructions 140 instruct the first spacecraft 102 to maneuver toward the target point 312 along the boundary 116, where the target point 312 is determined based on the first cost 122 and the second cost 124, as described previously with reference to FIGS. 1-4. For example, the target point 312 can be determined by a curve fitting process between two highly-ranked test points 306, interpolating the location of the target point 312 between a set of highly-ranked test points 306, selecting the highest-ranked test point 306, generating a second set of test points between a set of highly-ranked test points 306, etc.

In some implementations, maneuvering the first spacecraft toward the target point along the boundary can occur after the first spacecraft is within a threshold distance from the two-dimensional plane. For example, the maneuvering instructions can include data indicating that the COLA maneuver should occur at a particular location in the first spacecraft's trajectory, where the particular location is within a threshold distance of the beta-plane (e.g., the plane 114 of FIG. 1).

Although the method 500 is illustrated as including a certain number of steps, more, fewer, and/or different steps can be included in the method 500 without departing from the scope of the present disclosure. For example, the method 500 can repeat the operations described with reference to block 510 multiple times for multiple sets of the test points 306 on the boundary 116. As an additional example, the method 500 can include determining a point of closest approach between the first spacecraft and the second spacecraft, where the point of closest approach corresponds to a projected intersection point (e.g., the third position 222 of FIGS. 2 and 4) on the plane 114 for the first spacecraft 102 of FIG. 1, and to determine, based on the point of closest approach, a projected closest distance (e.g., the magnitude of the miss vector 210 of FIGS. 2-4) between the first spacecraft 102 and the second spacecraft 104.

Figure 6:
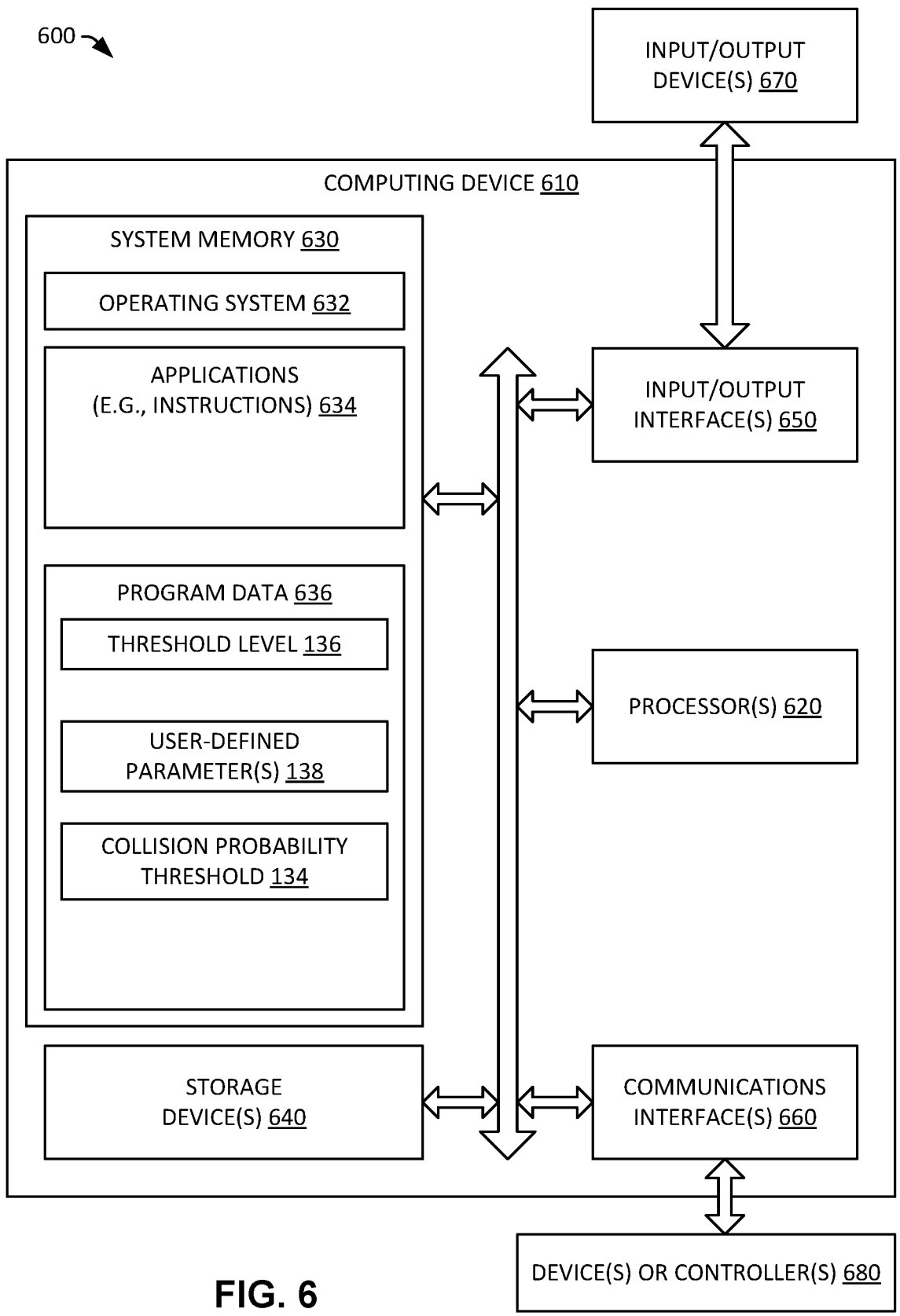
FIG. 6 is a block diagram of a computing environment including a computing device configured to support aspects of computer-implemented methods and computer-executable program instructions (or code), in accordance with at least one implementation of the subject disclosure

FIG. 6 is a block diagram of a computing environment 600 including a computing device 610 configured to support aspects of computer-implemented methods and computer-executable program instructions (or code), in accordance with at least one implementation of the subject disclosure. For example, the computing device 610, or portions thereof, is configured to execute instructions to initiate, perform, or control one or more operations described previously with reference to FIGS. 1-5. In a particular aspect, the computing device 610 can include the computing device(s) 110 of FIG. 1, one or more servers, one or more virtual devices, or a combination thereof.

The computing device 610 includes one or more processors 620. In a particular aspect, the processor(s) 620 correspond to the processor(s) 130 of FIG. 1. The processor(s) 620 is configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which can include a basic input/output system for booting the computing device 610 as well as a full operating system to enable the computing device 610 to interact with users, other programs, and other devices. The system memory 630 stores system (program) data 636, such as instructions, the threshold level 136, the user-defined parameter(s) 138, the collision probability threshold 134 of FIG. 1, or a combination thereof.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-5. To illustrate, the one or more applications 634 include instructions executable by the processor(s) 620 to initiate, control, or perform one or more operations described with reference to the threshold level 136, the user-defined parameter(s) 138, the collision probability threshold 134, or a combination thereof.

In a particular implementation, the system memory 630 includes a non-transitory, computer readable medium (e.g., a computer-readable storage device) storing instructions that, when executed by the processor(s) 620, cause the processor(s) 620 to initiate, perform, or control operations to avoid a spacecraft collision. The operations include determining a collision probability between a first spacecraft and a second spacecraft. The operations also include, in response to a determination that the collision probability exceeds a threshold, identifying a two-dimensional plane that is orthogonal to a relative velocity between the first spacecraft and the second spacecraft. The operations also include determining a boundary on the two-dimensional plane that, when intersected by the first spacecraft, reduces the collision probability to a threshold level. The operations also include selecting at least a first test point along the boundary and a second test point along the boundary. The operations also include determining a first cost associated with maneuvering the first spacecraft towards the first test point and a second cost associated with maneuvering the first spacecraft towards the second test point, the first cost and the second cost based on one or more user-defined parameters. The operations also include maneuvering the first spacecraft toward a target point along the boundary that is determined based on the first cost and the second cost.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 enable the computing device 610 to communicate with one or more input/output devices 670 to facilitate user interaction. For example, the one or more input/output interfaces 650 can include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 670 include one or more user interface devices and displays, including some combination of buttons, keyboards, pointing devices, displays, speakers, microphones, touch screens, and other devices. In a particular aspect, the input/output device(s) 670 include communication interface(s) between the computing device(s) 110 and the first spacecraft 102 and/or the second spacecraft 104 of FIG. 1.

The processor(s) 620 are configured to communicate with devices or controllers 680 via the one or more communications interfaces 660. For example, the one or more communications interfaces 660 can include a network interface. The devices or controllers 680 can include, for example, one or more components of the first spacecraft 102 and/or the second spacecraft 104 of FIG. 1, one or more other devices, or any combination thereof.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-5. In some implementations, part or all of one or more of the operations or methods of FIGS. 1-5 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a device includes a memory and one or more processors coupled to the memory. The one or more processors are configured to determine a collision probability between a first spacecraft and a second spacecraft. The one or more processors are also configured to, in response to a determination that the collision probability exceeds a threshold, identify a two-dimensional plane that is orthogonal to a relative velocity between the first spacecraft and the second spacecraft. The one or more processors are also configured to determine a boundary on the two-dimensional plane that, when intersected by the first spacecraft, reduces the collision probability to a threshold level. The one or more processors are also configured to select at least a first test point along the boundary and a second test point along the boundary. The one or more processors are also configured to determine a first cost associated with maneuvering the first spacecraft towards the first test point and a second cost associated with maneuvering the first spacecraft towards the second test point, the first cost and the second cost based on one or more user-defined parameters. The one or more processors are also configured to maneuver the first spacecraft toward a target point along the boundary that is determined based on the first cost and the second cost.

Clause 2 includes the device of Clause 1, wherein the one or more processors are further configured to determine a first change in velocity for the first spacecraft that would enable the first spacecraft to intersect the two-dimensional plane at the first test point. The one or more processors are also further configured to determine a second change in velocity for the first spacecraft that would enable the first spacecraft to intersect the two-dimensional plane at the second test point. The one or more user-defined parameters include cost functions associated with the first change in velocity and the second change in velocity.

Clause 3 includes the device of Clause 1 or Clause 2, wherein the boundary is substantially elliptical.

Clause 4 includes the device of any of Clauses 1 to 3, wherein the one or more processors are further configured to select a plurality of test points along the boundary, wherein the first test point and the second test point are included in the plurality of test points. The one or more processors are also further configured to, for each test point of the plurality of test points, determine an associated cost with maneuvering the first spacecraft towards the test point, wherein the associated costs are based on the one or more user-defined parameters. The one or more processors are also further configured to determine the target point based on the associated costs.

Clause 5 includes the device of Clause 4, wherein the one or more processors are further configured to rank the plurality of test points based on the corresponding associated costs associated with maneuvering the first spacecraft towards each corresponding test point. The one or more processors are also further configured to identify a highest-ranked test point of the plurality of test points. The one or more processors are also further configured to select one or more neighboring test points of the highest-ranked test point. The one or more processors are also further configured to use a curve-fitting operation based on the highest-ranked test point and the one or more neighboring test points to determine the target point.

Clause 6 includes the device of Clause 4, wherein the one or more user-defined parameters include one or more cost functions associated with a burn direction for maneuvering the first spacecraft to a particular test point of the plurality of test points, a change in orbit period associated with maneuvering the first spacecraft to the particular test point, a change in velocity associated with maneuvering the first spacecraft to the particular test point, a point of closest approach with another object based on maneuvering the first spacecraft to the particular test point, a comparison of a perigee associated with maneuvering the first spacecraft to the particular test point to a perigee height lower threshold, or an offset correction with respect to a position of the second spacecraft associated with maneuvering the first spacecraft to the particular test point.

Clause 7 includes the device of any of Clauses 1 to 6, wherein the one or more processors are further configured to determine a point of closest approach between the first spacecraft and the second spacecraft, the point of closest approach corresponding to a projected intersection point on the two-dimensional plane for the first spacecraft. The one or more processors are also further configured to determine, based on the point of closest approach, a projected closest distance between the first spacecraft and the second spacecraft.

Clause 8 includes the device of any of Clauses 1 to 7, wherein the collision probability is based on a first covariance associated with the first spacecraft and a second covariance associated with the second spacecraft.

Clause 9 includes the device of any of Clauses 1 to 8, where the first spacecraft corresponds to a first satellite, and wherein the second spacecraft corresponds to a second satellite.

According to Clause 10, a method includes determining a collision probability between a first spacecraft and a second spacecraft. The method also includes, in response to a determination that the collision probability exceeds a threshold, identifying a two-dimensional plane that is orthogonal to a relative velocity between the first spacecraft and the second spacecraft. The method also includes determining a boundary on the two-dimensional plane that, when intersected by the first spacecraft, reduces the collision probability to a threshold level. The method also includes selecting at least a first test point along the boundary and a second test point along the boundary. The method also includes determining a first cost associated with maneuvering the first spacecraft towards the first test point and a second cost associated with maneuvering the first spacecraft towards the second test point, the first cost and the second cost based on one or more user-defined parameters. The method also includes maneuvering the first spacecraft toward a target point along the boundary that is determined based on the first cost and the second cost.

Clause 11 includes the method of Clause 10, the method also including determine a first change in velocity for the first spacecraft that would enable the first spacecraft to intersect the two-dimensional plane at the first test point. The method also includes determining a second change in velocity for the first spacecraft that would enable the first spacecraft to intersect the two-dimensional plane at the second test point. The one or more user-defined parameters include cost functions associated with the first change in velocity and the second change in velocity.

Clause 12 includes the method of Clause 10 or Clause 11, wherein the first spacecraft is maneuvered after the first spacecraft is within a threshold distance from the two-dimensional plane.

Clause 13 includes the method of any of Clauses 10 to 12, the method also including selecting a plurality of test points along the boundary, wherein the first test point and the second test point are included in the plurality of test points. The method also includes, for each test point of the plurality of test points, determining an associated cost with maneuvering the first spacecraft towards the test point, wherein the associated costs are based on the one or more user-defined parameters. The method also includes determining the target point based on the associated costs.

Clause 14 includes the method of Clause 13, wherein determining the target point includes ranking the plurality of test points based on the corresponding associated costs associated with maneuvering the first spacecraft towards each corresponding test point. Determining the target point also includes identifying a highest-ranked test point of the plurality of test points, selecting one or more neighboring test points of the highest-ranked test point, and using a curve-fitting operation based on the highest-ranked test point and the one or more neighboring test points to determine the target point.

Clause 15 includes the method of Clause 13, wherein the one or more user-defined parameters include one or more cost functions associated with a burn direction for maneuvering the first spacecraft to a particular test point of the plurality of test points, a change in orbit period associated with maneuvering the first spacecraft to the particular test point, a change in velocity associated with maneuvering the first spacecraft to the particular test point, a point of closest approach with another object based on maneuvering the first spacecraft to the particular test point, a comparison of a perigee associated with maneuvering the first spacecraft to the particular test point to a perigee height lower threshold, or an offset correction with respect to a position of the second spacecraft associated with maneuvering the first spacecraft to the particular test point.

Clause 16 includes the method of any of Clauses 10 to 15, the method also including determining a point of closest approach between the first spacecraft and the second spacecraft, the point of closet approach corresponding to a projected intersection point on the two-dimensional plane for the first spacecraft. The method also includes determining, based on the point of closest approach, a projected closest distance between the first spacecraft and the second spacecraft.

Clause 17 includes the method of any of Clauses 10 to 16, wherein the collision probability is based on a first covariance associated with the first spacecraft and a second covariance associated with the second spacecraft.

Clause 18 includes the method of any of Clauses 10 to 17, where the first spacecraft corresponds to a first satellite, and wherein the second spacecraft corresponds to a second satellite.

According to Clause 19, a non-transitory computer-readable medium includes instructions that, when executed by one or more processors, cause the one or more processors to determine a collision probability between a first spacecraft and a second spacecraft. The instructions, when executed by one or more processors, also cause the one or more processors to, in response to a determination that the collision probability exceeds a threshold, identify a two-dimensional plane that is orthogonal to a relative velocity between the first spacecraft and the second spacecraft. The instructions, when executed by one or more processors, also cause the one or more processors to determine a boundary on the two-dimensional plane that, when intersected by the first spacecraft, reduces the collision probability to a threshold level. The instructions, when executed by one or more processors, also cause the one or more processors to select at least a first test point along the boundary and a second test point along the boundary. The instructions, when executed by one or more processors, also cause the one or more processors to determine a first cost associated with maneuvering the first spacecraft towards the first test point and a second cost associated with maneuvering the first spacecraft towards the second test point, the first cost and the second cost based on one or more user-defined parameters. The instructions, when executed by one or more processors, also cause the one or more processors to maneuver the first spacecraft toward a target point along the boundary that is determined based on the first cost and the second cost.

Clause 20 includes the non-transitory computer-readable medium of Clause 19, wherein the instructions, when executed by the one or more processors, further cause the one or more processors to determine a first change in velocity for the first spacecraft that would enable the first spacecraft to intersect the two-dimensional plane at the first test point. The instructions, when executed by one or more processors, also cause the one or more processors to determine a second change in velocity for the first spacecraft that would enable the first spacecraft to intersect the two-dimensional plane at the second test point. The one or more user-defined parameters include cost functions associated with the first change in velocity and the second change in velocity.

Clause 21 includes the non-transitory computer-readable medium of Clause 19 or Clause 20, wherein the boundary is substantially elliptical.

Clause 22 includes the non-transitory computer-readable medium of any of Clauses 19 to 21, wherein the instructions, when executed by the one or more processors, further cause the one or more processors to select a plurality of test points along the boundary, wherein the first test point and the second test point are included in the plurality of test points. The instructions, when executed by one or more processors, also cause the one or more processors to, for each test point of the plurality of test points, determine an associated cost with maneuvering the first spacecraft towards the test point, wherein the associated costs are based on the one or more user-defined parameters. The instructions, when executed by one or more processors, also cause the one or more processors to determine the target point based on the associated costs.

Clause 23 includes the non-transitory computer-readable medium of Clause 22, wherein the instructions, when executed by the one or more processors, further cause the one or more processors to rank the plurality of test points based on the corresponding associated costs associated with maneuvering the first spacecraft towards each corresponding test point. The instructions, when executed by one or more processors, also cause the one or more processors to identify a highest-ranked test point of the plurality of test points. The instructions, when executed by one or more processors, also cause the one or more processors to select one or more neighboring test points of the highest-ranked test point. The instructions, when executed by one or more processors, also cause the one or more processors to use a curve-fitting operation based on the highest-ranked test point and the one or more neighboring test points to determine the target point.

Clause 24 includes the non-transitory computer-readable medium of Clause 22, wherein the one or more user-defined parameters include one or more cost functions associated with a burn direction for maneuvering the first spacecraft to a particular test point of the plurality of test points, a change in orbit period associated with maneuvering the first spacecraft to the particular test point, a change in velocity associated with maneuvering the first spacecraft to the particular test point, a point of closest approach with another object based on maneuvering the first spacecraft to the particular test point, a comparison of a perigee associated with maneuvering the first spacecraft to the particular test point to a perigee height lower threshold, or an offset correction with respect to a position of the second spacecraft associated with maneuvering the first spacecraft to the particular test point.

Clause 25 includes the non-transitory computer-readable medium of any of Clauses 19 to 24, wherein the instructions, when executed by one or more processors, also cause the one or more processors to determine a point of closest approach between the first spacecraft and the second spacecraft, the point of closest approach corresponding to a projected intersection point on the two-dimensional plane for the first spacecraft. The instructions, when executed by one or more processors, also cause the one or more processors to determine, based on the point of closest approach, a projected closest distance between the first spacecraft and the second spacecraft.

Clause 26 includes the non-transitory computer-readable medium of any of Clauses 19 to 25, wherein the collision probability is based on a first covariance associated with the first spacecraft and a second covariance associated with the second spacecraft.

Clause 27 includes the non-transitory computer-readable medium of any of Clauses 19 to 26, where the first spacecraft corresponds to a first satellite, and wherein the second spacecraft corresponds to a second satellite.

What is claimed is:
1. A device comprising:
a memory; and
one or more processors coupled to the memory, the one or more processors configured to:
determine a collision probability between a first spacecraft and a second spacecraft;
in response to a determination that the collision probability exceeds a threshold, identify a two-dimensional plane that is orthogonal to a relative velocity between the first spacecraft and the second spacecraft;
determine a boundary on the two-dimensional plane that, when intersected by the first spacecraft, reduces the collision probability to a threshold level;
select at least a first test point along the boundary and a second test point along the boundary;
determine a first cost associated with maneuvering the first spacecraft towards the first test point and a second cost associated with maneuvering the first spacecraft towards the second test point, the first cost and the second cost based on one or more user-defined parameters; and
maneuver the first spacecraft toward a target point along the boundary that is determined based on the first cost and the second cost.

2. The device of claim 1, wherein the one or more processors are further configured to:
determine a first change in velocity for the first spacecraft that would enable the first spacecraft to intersect the two-dimensional plane at the first test point; and
determine a second change in velocity for the first spacecraft that would enable the first spacecraft to intersect the two-dimensional plane at the second test point,
wherein the one or more user-defined parameters include cost functions associated with the first change in velocity and the second change in velocity.

3. The device of claim 1, wherein the boundary is substantially elliptical.

4. The device of claim 1, wherein the one or more processors are further configured to:
select a plurality of test points along the boundary, wherein the first test point and the second test point are included in the plurality of test points;
for each test point of the plurality of test points, determine an associated cost with maneuvering the first spacecraft towards the test point, wherein the associated costs are based on the one or more user-defined parameters; and
determine the target point based on the associated costs.

5. The device of claim 4, wherein the one or more processors are further configured to:
rank the plurality of test points based on the corresponding associated costs associated with maneuvering the first spacecraft towards each corresponding test point;
identify a highest-ranked test point of the plurality of test points;
select one or more neighboring test points of the highest-ranked test point; and
use a curve-fitting operation based on the highest-ranked test point and the one or more neighboring test points to determine the target point.

6. The device of claim 4, wherein the one or more user-defined parameters include one or more cost functions associated with a burn direction for maneuvering the first spacecraft to a particular test point of the plurality of test points, a change in orbit period associated with maneuvering the first spacecraft to the particular test point, a change in velocity associated with maneuvering the first spacecraft to the particular test point, a point of closest approach with another object based on maneuvering the first spacecraft to the particular test point, a comparison of a perigee associated with maneuvering the first spacecraft to the particular test point to a perigee height lower threshold, or an offset correction with respect to a position of the second spacecraft associated with maneuvering the first spacecraft to the particular test point.

7. The device of claim 1, wherein the one or more processors are further configured to:
determine a point of closest approach between the first spacecraft and the second spacecraft, the point of closest approach corresponding to a projected intersection point on the two-dimensional plane for the first spacecraft; and
determine, based on the point of closest approach, a projected closest distance between the first spacecraft and the second spacecraft.

8. The device of claim 1, wherein the collision probability is based on a first covariance associated with the first spacecraft and a second covariance associated with the second spacecraft.

9. A method comprising:
determining a collision probability between a first spacecraft and a second spacecraft;
in response to a determination that the collision probability exceeds a threshold, identifying a two-dimensional plane that is orthogonal to a relative velocity between the first spacecraft and the second spacecraft;
determining a boundary on the two-dimensional plane that, when intersected by the first spacecraft, reduces the collision probability to a threshold level;
selecting at least a first test point along the boundary and a second test point along the boundary;
determining a first cost associated with maneuvering the first spacecraft towards the first test point and a second cost associated with maneuvering the first spacecraft towards the second test point, the first cost and the second cost based on one or more user-defined parameters; and
maneuvering the first spacecraft toward a target point along the boundary that is determined based on the first cost and the second cost.

10. The method of claim 9, further comprising:
determining a first change in velocity for the first spacecraft that would enable the first spacecraft to intersect the two-dimensional plane at the first test point; and
determining a second change in velocity for the first spacecraft that would enable the first spacecraft to intersect the two-dimensional plane at the second test point,
wherein the one or more user-defined parameters include cost functions associated with the first change in velocity and the second change in velocity.

11. The method of claim 9, wherein the first spacecraft is maneuvered after the first spacecraft is within a threshold distance from the two-dimensional plane.

12. The method of claim 9, further comprising:
selecting a plurality of test points along the boundary, wherein the first test point and the second test point are included in the plurality of test points;
for each test point of the plurality of test points, determining an associated cost with maneuvering the first spacecraft towards the test point, wherein the associated costs are based on the one or more user-defined parameters; and
determining the target point based on the associated costs.

13. The method of claim 12, wherein determining the target point includes:
ranking the plurality of test points based on the corresponding associated costs associated with maneuvering the first spacecraft towards each corresponding test point;
identifying a highest-ranked test point of the plurality of test points;
selecting one or more neighboring test points of the highest-ranked test point; and
using a curve-fitting operation based on the highest-ranked test point and the one or more neighboring test points to determine the target point.

14. The method of claim 12, wherein the one or more user-defined parameters include one or more cost functions associated with a burn direction for maneuvering the first spacecraft to a particular test point of the plurality of test points, a change in orbit period associated with maneuvering the first spacecraft to the particular test point, a change in velocity associated with maneuvering the first spacecraft to the particular test point, a point of closest approach with another object based on maneuvering the first spacecraft to the particular test point, a comparison of a perigee associated with maneuvering the first spacecraft to the particular test point to a perigee height lower threshold, or an offset correction with respect to a position of the second spacecraft associated with maneuvering the first spacecraft to the particular test point.

15. The method of claim 9, further comprising:
determining a point of closest approach between the first spacecraft and the second spacecraft, the point of closest approach corresponding to a projected intersection point on the two-dimensional plane for the first spacecraft; and determining, based on the point of closest approach, a projected closest distance between the first spacecraft and the second spacecraft.

16. The method of claim 9, wherein the collision probability is based on a first covariance associated with the first spacecraft and a second covariance associated with the second spacecraft.

17. The method of claim 9, where the first spacecraft corresponds to a first satellite, and wherein the second spacecraft corresponds to a second satellite.

18. A non-transitory computer-readable medium comprising instructions that, when executed by one or more processors, cause the one or more processors to:
determine a collision probability between a first spacecraft and a second spacecraft;
in response to a determination that the collision probability exceeds a threshold, identify a two-dimensional plane that is orthogonal to a relative velocity between the first spacecraft and the second spacecraft;
determine a boundary on the two-dimensional plane that, when intersected by the first spacecraft, reduces the collision probability to a threshold level;
select at least a first test point along the boundary and a second test point along the boundary;
determine a first cost associated with maneuvering the first spacecraft towards the first test point and a second cost associated with maneuvering the first spacecraft towards the second test point, the first cost and the second cost based on one or more user-defined parameters; and
maneuver the first spacecraft toward a target point along the boundary that is determined based on the first cost and the second cost.

19. The non-transitory computer-readable medium of claim 18, wherein the instructions, when executed by the one or more processors, further cause the one or more processors to:
determine a first change in velocity for the first spacecraft that would enable the first spacecraft to intersect the two-dimensional plane at the first test point; and
determine a second change in velocity for the first spacecraft that would enable the first spacecraft to intersect the two-dimensional plane at the second test point,
wherein the one or more user-defined parameters include cost functions associated with the first change in velocity and the second change in velocity.

20. The method of claim 9, further comprising:
determining a point of closest approach between the first spacecraft and the second spacecraft; and
in response to the determination that the collision probability exceeds the threshold, based on a current distance between the first spacecraft and the point of closest approach, deferring a decision to maneuver the first spacecraft.

* * * * *